United States Patent [19]

Adams et al.

[11] Patent Number: 5,782,479
[45] Date of Patent: Jul. 21, 1998

[54] STEERING MECHANISM SAFETY SYSTEM

[75] Inventors: Richard J. Adams, Boulder; Mark N. Pippin, Golden, both of Colo.

[73] Assignee: Schwinn Cycling & Fitness Inc., Boulder, Colo.

[21] Appl. No.: 667,429

[22] Filed: Jun. 21, 1996

[51] Int. Cl.⁶ .................................................. B62K 21/18
[52] U.S. Cl. .................................................. 280/279
[58] Field of Search ............................... 280/270, 274, 280/279, 280; 74/551.1, 551.3

[56] References Cited

U.S. PATENT DOCUMENTS

| 607,106 | 7/1898 | Winton | 280/279 |
|---|---|---|---|
| 623,832 | 4/1899 | Russell et al. | 280/280 |
| 5,517,878 | 5/1996 | Klein. | |

FOREIGN PATENT DOCUMENTS

| 404325388 | 11/1992 | Japan | 280/280 |
|---|---|---|---|
| 232281 | 10/1994 | Taiwan. | |
| 251551 | 7/1995 | Taiwan. | |
| 24900 | 5/1896 | United Kingdom | 280/279 |
| 3748 | 12/1899 | United Kingdom | 280/279 |

*Primary Examiner*—Ed L. Swinehart
*Attorney, Agent, or Firm*—Holland & Hart LLP

[57] ABSTRACT

A steering control safety mechanism is provided for a bicycle having a cylindrical head tube, a hollow steerer tube rotatably positioned in the head tube, a fork, and a stem releasably attachable to an upper end of the steerer tube for rigidly fixing a handlebar to the steerer tube. The safety mechanism includes a cylindrical torque transfer member positioned in the steerer tube, a wedge member positioned in the steerer tube below the torque transfer member, and a bolt rotationally positioned in the passageway of torque transfer member, supported on the torque transfer member, and aligned to laterally offset the wedge member from the torque transfer member and cause the torque transfer member and the wedge member to form a jam fit. A first steering control path is defined in the steering mechanism by connections between the handlebar, stem, steerer tube and fork. A second steering control path is defined in the steering mechanism by connections between the handlebar, stem, torque transfer member, wedge member, steerer tube and fork. The second steering control path is utilized upon the failure of the steerer tube. A method of maintaining steering control of a bicycle is also disclosed in which a bicycle having a handlebar, stem, steerer tube, fork, and connections thereamong is provided with a backup steering control system which is operative upon failure of the steerer tube.

8 Claims, 4 Drawing Sheets

STEERING MECHANISM SAFETY SYSTEM

BACKGROUND OF THE INVENTION

1. Field of the Invention

This invention relates to bicycles, and more particularly relates to a new and improved bicycle steering mechanism safety system for maintaining control of the steering function when the steerer tube breaks.

2. Background

The use of bicycles for exercise has become increasingly popular in recent years. Indeed, bicycles are now used by many to commute to and from work. Recreational and competitive uses of bicycles now include leisure riding, trick jumping and downhill racing. As the use of bicycles becomes more aggressive, certain safety features become increasingly important to protect against structural failure of the bicycle and the possibility of resulting injury to the rider.

The steering mechanism on a bicycle is a component which is subject to breakage and failure during aggressive use. BMX (bicycle moto-cross) racing, trick jumping and downhill mountain bicycle racing involve the type of aggressive bicycle riding where failure of a steering mechanism can cause serious injury or death to the bicycle rider. For example, in trick jumping the rider jumps a BMX-style bicycle from a ramp and performs acrobatic movements in the air prior to landing. The rider may even perform such tricks 20 to 30 feet in the air and then land while riding the bicycle. Failure of the steering mechanism at any time during the trick jump can result in the rider losing steering control of the front wheel. Generally the steering mechanism fails upon impact at landing when steering control is critical. This may well result in a dangerous crash.

Typical steering mechanisms in bicycles, including high-end BMX and in some mountain bicycles, include a steerer tube. The steerer tube is received in a head tube of a bicycle frame and positioned through a headset bearing. The steerer tube is attached at a lower end to a fork for receiving the front wheel, and is attached at a top end to a stem which connects the handlebars to the steerer tube. One such steering mechanism includes the A HEADSET.

The steering control in a typical steering mechanism comprises the rigid connections between the handlebar and the stem, the stem and the steerer tube, and the steerer tube and the fork. As the rider turns the handlebars, the turning force is applied to the steerer tube through the stem, which in turn directs the front wheel.

Failure of the steering mechanism generally involves a cracked or severed steerer tube which typically results from the large impact forces experienced on landing after a jump. This is because the rider imparts forces to both the pedals and the handlebars when landing. The handlebars act as a lever arm to accentuate the force applied thereto, which in turn is magnified at the steerer tube. Failures typically occur at a distance of up to four inches below the stem. If the steerer tube is severed upon landing, the rider may lose either partial or entire use of the steering mechanism, and generally will crash.

The inherent weakness of conventional steerer tube design, resulting from weight and size constraints, may affect rider confidence. This can inhibit the rider's desire to perform more aggressive tricks at higher jumping heights.

It is with respect to these considerations and other background information relative to prior art steering mechanisms that the significant improvements of the present invention have evolved.

SUMMARY OF THE INVENTION

The principal object of the present invention is to provide a safety mechanism for a steering mechanism that allows a bicycle rider to maintain steering control upon failure of the steerer tube component in the primary steering control path.

Another object of the present invention is to provide a safety mechanism which allows a bicycle rider to maintain steering control after failure of the primary steering control path and which mounts in a headset of a bicycle.

Another object of the present invention is to provide a safety mechanism having the aforementioned qualities, which automatically engages upon failure of the primary steering control path.

In accordance with the foregoing objects, the present invention is embodied in a backup steering control system for a bicycle. The preferred embodiment of the present invention is mounted to a bicycle having a cylindrical head tube, a hollow steerer tube rotatably positioned in the head tube, a fork affixed to a lower end of the steerer tube, and a stem releasably attachable to an upper end of the steerer tube to rigidly fix the bicycle's handlebar to the steerer tube. The safety mechanism of the present invention includes a cylindrical torque transfer member positioned in the steerer tube, a wedge member positioned in the steerer tube below the torque transfer member, and a bolt rotationally positioned in the passageway of the torque transfer member, supported on the torque transfer member, and aligned to laterally offset said wedge member from the torque transfer member and cause the torque transfer member and wedge member to form a jam fit. The stem engages both the steerer tube and the torque transfer member in a force-transmitting manner.

A first steering control path is defined in the steering mechanism by connections between the handlebar, stem, steerer tube and fork. A second steering control path is defined in the steering mechanism by connections between the handlebar, stem, torque transfer member, wedge member, steerer tube and fork. The second steering control path is utilized upon the failure of the steerer tube.

The present invention also includes a method of maintaining steering control of a bicycle having a handlebar, stem, steerer tube, fork, and connections thereamong. The method includes providing the bicycle with a backup steering control system which is operative only upon failure of the steerer tube.

Other aspects, features and details of the present invention can be more completely understood by reference to the following detailed description of a preferred embodiment, taken in conjunction with the drawings, and from the appended claims.

DETAILED DESCRIPTION

Figures 1, 2:
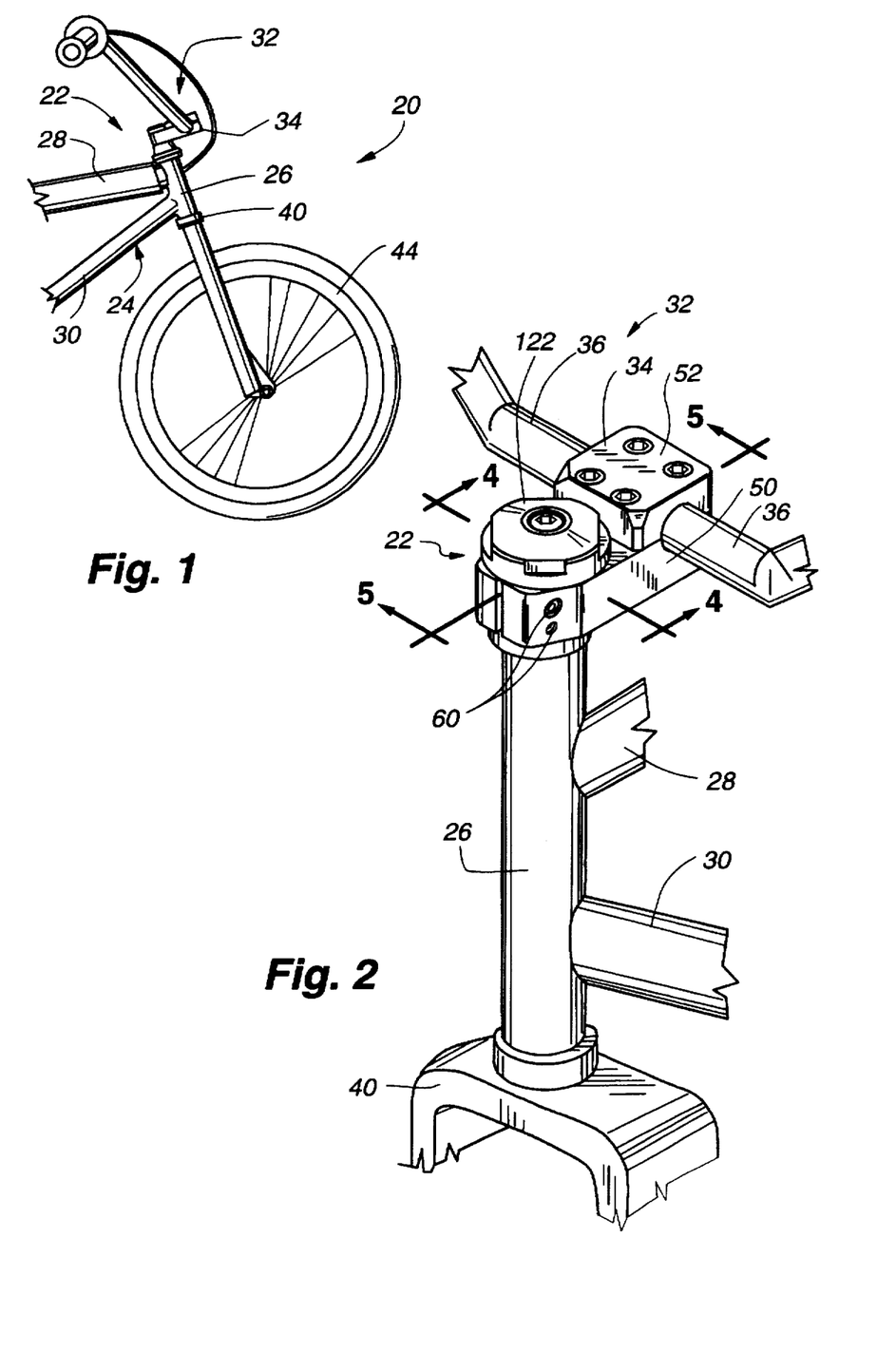
FIG. 1 is a diagrammatic side view of the front half of a bicycle incorporating the steering control safety mechanism of the present invention.
FIG. 2 is an enlarged isometric view of the steering control safety mechanism of the present invention shown in FIG. 1.

Referring first to FIG. 1, a bicycle 20 incorporating the headset safety mechanism 22 of the present invention is shown. The bicycle 20 comprises a frame 24 having a substantially vertically oriented head tube 26, with a top tube 28 extending laterally from the head tube 26, and a down tube 30 attached to the head tube 26 below the top tube 28 and extending generally at an angle downwardly from the head tube. A steering mechanism 32 is pivotally positioned in the head tube 26.

Referring now to FIGS. 1–5, the steering mechanism 32 includes a steerer tube 33 (FIGS. 3, 4 and 5) pivotally received through the head tube 26, a stem 34 for receiving and supporting a handlebar 36 releasably attached to a top end 38 of the steerer tube, and a fork 40 attached to a lower end 42 of the steerer tube 33 for rotationally receiving a front wheel 44. A headset, or thrust, bearing 46 (FIG. 4) of a conventional design is positioned in the head tube 26 to receive the steerer tube 33. The thrust bearing 46 firmly and pivotally positions the steerer tube 33 in the head tube 26 to allow the steering mechanism 32 to turn easily, without excess play.

More particularly, the steerer tube 33 defines a channel 48 and is relatively thin walled, having an outer diameter of approximately 1.0–1.25 inches, and a wall thickness of approximately 0.050–0.187 inches. The stem 34 includes a main body 50 and a detachable handlebar clamp 52. Formed in the main body 50 is a first bore 54 (FIG. 3) which extends from an upper surface 68 of the main body to a lower surface 69 of the main body, adjacent one end thereof, and receives the steerer tube 33. A slot 58 also extending from the upper surface to the lower surface of the stem 34 communicates with the bore 54. A pair of partially threaded apertures 60 are formed in a side 62 of the main body 50 of the stem 34, and extend through the slot 58, for receiving threaded fasteners 71 (FIG. 5) such as machine screws. When the stem 34 is removably installed on the steerer tube 33 with the threaded fastener engaged in the apertures 60, the slot 58 width is reduced, which reduces the circumference of the first bore 54, thereby allowing the stem 34 to clampingly engage the steerer tube 33.

A substantially horizontal lower groove 66 transverse to the bore 54 is formed in the upper surface 68 of the main body 50 of the stem 34. An upper groove 70 is formed on a bottom surface 72 of the handlebar clamping member 52 corresponding to the groove 66 on the upper surface 68 of the main body 50 of the stem 34. When the clamping member 52 is mated to the main body 50, the transverse grooves 66, 70 receive a base portion of the handlebar 36. The grooves 66, 70 are dimensioned so that the base of the handlebar 36 is releasably and rigidly clamped in a stable position to the stem 34. The handlebars 36 are thus rigidly affixed in a torque transferring relationship to the steerer tube 33 through the stem 34, forming a portion of the primary steering control path described in further detail below.

Four upper handlebar fastening bores 74 extend downwardly through the handlebar clamping member 52, in alignment with four lower handlebar fastening bores 75 extending downwardly through the body 50 of the stem 34. Four threaded fasteners 76 (FIG. 5) are threadedly received in the handlebar fastening bores 74, 75 to affix the handlebar clamping member 52 to the main body 50 of the stem 34, thereby clamping the base of the handlebar 36 between the transverse grooves 66, 70.

Figure 3:
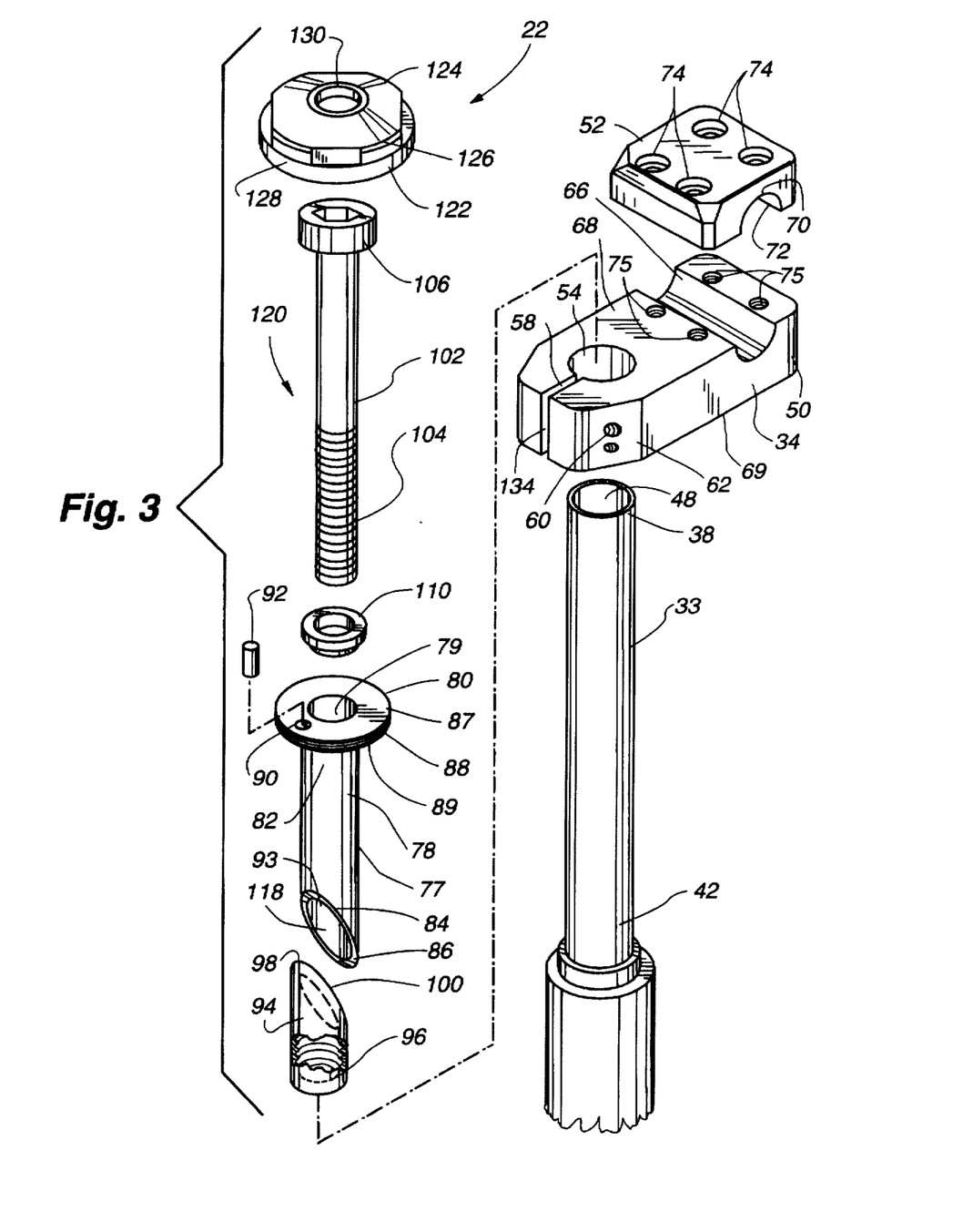
FIG. 3 is an exploded view of the steering control safety mechanism of the present invention shown in FIG. 2.
Figure 4:
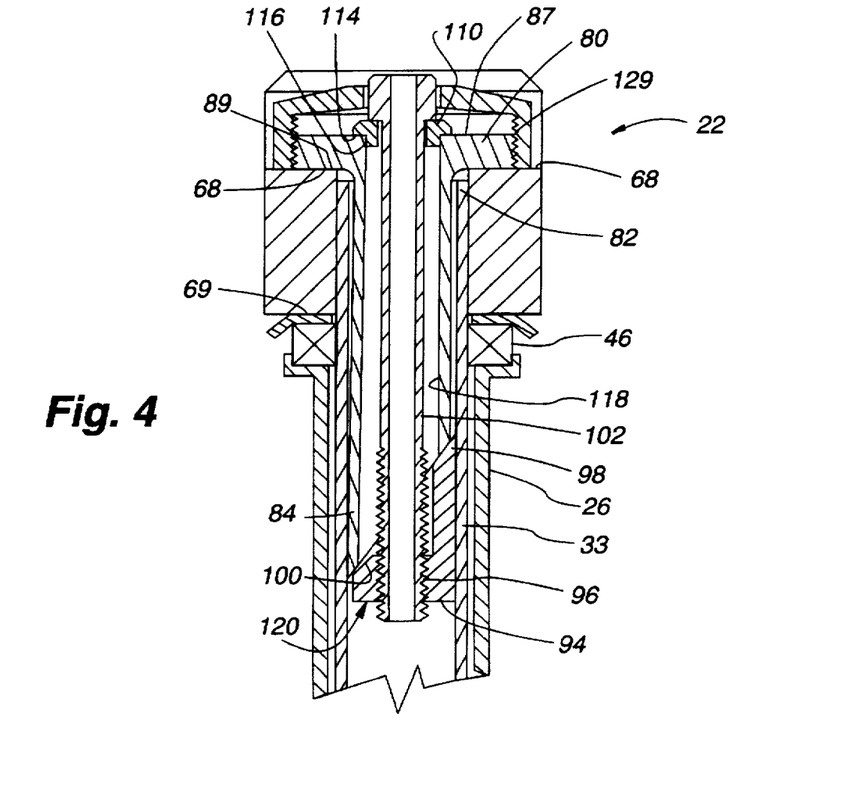
FIG. 4 is a horizontal section view of the steering control safety mechanism of the present invention taken along the line 4—4 of FIG. 2.

As shown in FIGS. 3 and 4, the safety mechanism 22 of the present invention inserts into the steerer tube 33, and includes a torque transfer member 77 having an elongated hollow cylindrical main body 78 defining a passageway 79, a laterally extending annular flange 80 at a top end 82, and an angled bottom end 84 defining an engagement surface 86. The annular flange 80 includes an upper surface 87, a lower surface 89, and a threaded circumferential edge 88. Formed in the flange 80 is an aperture 90 into which a dowel pin 92 is fixedly positioned and extends downwardly therefrom approximately 0.375 inches. The angled bottom end 84 is formed by an angle cut through the main body 78, which forms a roughly elliptically shaped opening 93 with the exposed sections of the walls of the main body forming the engagement surface 86. A wedge member 94 having a partially threaded internal cavity 96 includes a top end 98 having a corresponding angled shape which defines a complementary engagement surface 100 for mating with and slidably engaging the bottom end 84 of the hollow cylindrical main body 78, as is described in more detail below.

The safety mechanism 22 further includes a hollow bolt 102 having a threaded lower end 104 and a standard nut head 106, which is received through the passageway 79 of the main body 78 to threadedly engage the threaded cavity 96 of the wedge 94. An annular washer 110 is positioned between the nut head 106 of the hollow bolt 102 and the upper surface 87 of the annular flange 80 of the main body 78 and acts to center the bolt 102 in the main body 78. The washer 110 defines a downwardly facing annular engagement surface 114 formed at a right angle to an outwardly facing annular engagement surface 116 (see FIGS. 4 and 5). The downwardly facing engagement surface 114 contacts the upper surface 87 of the annular flange 80, and the outwardly facing engagement surface 116 contacts the inner wall 118 of the passageway 79 formed in the main body 78. The main body 78, in combination with the hollow bolt 102 and the wedge member 94, form a quill 120.

A top cap 122 includes a central portion 124, a circumference 126 and a rim 128. The rim 128, which extends substantially perpendicularly from the central portion 124 and includes internal threads 129, is positioned over the annular flange 80. The internal threads 129 of the top cap 122 threadedly engage the threaded outer circumference 88 of the laterally extending flange 80 of the quill 120. Formed in the central body 124 of the top cap 122 is a centrally positioned aperture 130 which receives the nut head 106 at the top end of the hollow bolt 102 when the top cap 122 is threaded onto the quill 120.

In use, a bicycle rider steers the bicycle 20 utilizing components of the steering mechanism 32 which constitute a primary steering control path. The primary steering control path includes the rigid connection between the handlebar 36 and the stem 34, the stem and the steerer tube 33, the steerer tube and the fork 40, and the fork 40 and the front wheel 44.

Figure 5:
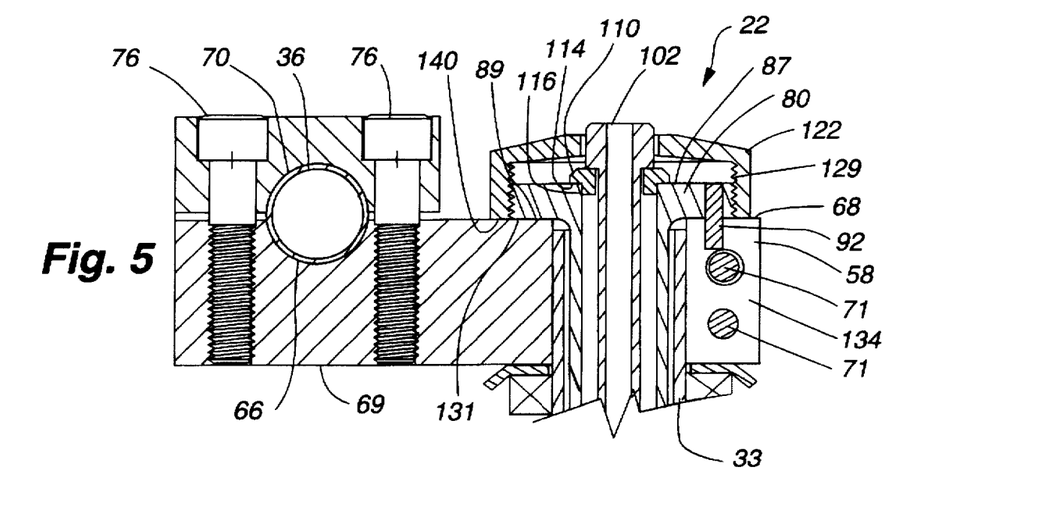
FIG. 5 is a horizontal section view of the headset safety mechanism of the present invention taken along the line 5—5 of FIG. 2.

As best shown in FIGS. 4 and 5, the safety mechanism 22 defines a secondary steering control path between the handlebars 36 and the wheel 44 to facilitate continuous steering control in the event the steering tube 33 breaks anywhere coextensively along the length of the quill 120.

The secondary steering control path functions, in effect, as a backup steering control system.

To position the safety mechanism 22 in a steering mechanism 32, the washer 110 is first positioned at the top 82 of the passageway 79 in the main body 78, with the hollow bolt 102 then being positioned through the washer 110 and through the cavity 79 in the main body 78 to threadedly engage the threaded aperture 96 in the wedge portion 94. The engagement surface 86 on the bottom end 84 of the main body 78 and the engagement surface 100 on the top end 98 of the wedge 94 are oriented to mate with one another continuously along the respective engagement surfaces 86, 100. The stem 34 is then positioned loosely over the steerer tube 33. The bottom surface 69 of the stem 34 rests against the bearing 46 positioned in the head tube 26. The assembled quill 120 is then positioned in the steerer tube 33 with a bottom surface 89 of the annular flange 80 resting on the top surface 68 of the stem 34. The quill 120 is oriented such that the dowel 92 fits into the slot 58 formed integrally with the steerer tube bore 54 in the stem 34, which rotationally fixes the quill 120 with respect to the stem 34 by the engagement of the dowel 92 with the walls 134 of the slot 58. The engagement of the dowel pin 92 with the walls 134 of the slot 58 creates a rotationally stable interface between the stem and the quill 120.

The hollow bolt 102 is then tightened, conventionally by turning it in a clockwise manner, to draw the wedge portion 94 tightly against the main body 78. The engagement surface 100 on the top end 98 of the wedge portion 94 slides along the engagement surface 86 on the bottom end 84 of the main body to create a jam fit at the bottom end 84 of the quill 120 by forcing the main body 78 against one portion of the inner wall 118 of the steerer tube 33, and forcing the wedge portion 94 against the opposite portion of the inner wall 118 of the steerer tube 33. As shown in FIG. 4, the main body 78 deflects to the left and engages the steerer tube 33, while the wedge portion 94 is deflected to the right to additionally engage the inner wall 118 of the steerer tube 33. The tightening of the hollow bolt 102 thus creates a tight jam fit inside the steerer tube 33. The jam fit created by the offset positions of the bottom end 30 of the main body 78 and the wedge portion 94 creates a torque transmitting engagement between the quill 120 and the steerer tube 33.

In conventional bicycles, the steerer tube 33 is prone to failure as a result of the load placed upon the steerer tube 30 by the rider, for instance during the landing from a trick jump. The steerer tube 33 typically fails at the position where the stem 34 is connected to the steerer tube 33, and can also fail virtually anywhere along the length of the steerer tube 33. However, the headset safety mechanism 22 of the present invention is positioned inside of the steerer tube 33 and is rigidly affixed to the inside of the steerer tube 33 at one end and to the stem 34 at the other end such that if the steerer tube 33 fails at any position between the ends of the safety mechanism 22, the rider can maintain steering control of the bicycle 20 to avoid crashing and the likely injuries resulting therefrom.

The safety mechanism 22 thus defines a second steering control path in the event of the steerer tube 33 breaking anywhere along the length of the quill 120. The second steering control path includes the attachment between the handlebar 36 and the stem 34, the stem 34 and the quill 120 (through the engagement of the dowel pin 92 and the walls 134 of the slot 58), through the main body 72 of the quill 120 to the steerer tube 33 by way of the jam fit at the lower end 84 of the main body 72 of the quill 120 (by the offset lower end 84 of the main body 78 and wedge portion 94), to the fork 40, and finally to the wheel 44 through the fork 40. If the steerer tube 33 fails anywhere along the length of the quill 120 above the jam fit, the engagement of the dowel pin 92 in the slot 58 in combination with the jam fit, created by the interaction of the lower end 84 of the main body 72 with the wedge portion 94, allows the rider to maintain steering control of the bicycle 20 to come to a safe stop.

In the embodiment described above, the safety mechanism 22 of the present invention allows the rider to adjust the load on the thrust bearing 46 in the head tube 26 to remove any looseness in the connection of the steerer tube 33 and the head tube 26, while maintaining ease of rotation of the steerer tube 33 within the head tube 26. The thrust bearing 46 found in the head tube 26 is engaged at the bottom end by the top of the fork 40 and at the top end by the bottom surface 69 of the stem 34. After the quill 120 is inserted into the steerer tube 33 and the hollow bolt 102 is tightened to create the torque transferring jam fit at the bottom end 84 of the quill 120, as discussed above, the thrust bearing 46 is loaded to the desired level by threadedly engaging the top cap 122 with the flange 80 of the quill 120. The annular engagement surface 140 defined by the rim 128 of the top cap 122 pushes the loosely fitting stem 34 downwardly against the bearing 46 to load the thrust bearing 46 to the appropriate level. Preferably, the top cap 122 is turned only ⅛th to ¼th turn after initially engaging the top surface 68 of the stem 34 to properly load the thrust bearing 46. Once the thrust bearing 46 is moved downwardly by the engagement of the top cap 122 with the top surface 68 of the stem 34 the stem 34 is clamped to the outer surface of the steerer tube 33 as described above to secure the position of the stem 34 on the steerer tube 33, and to maintain the proper load on the bearing 46. The top cap 122 can then be removed, if desired, since the stem 34 is fixed to the steerer tube 33 to maintain the pre-load on the bearing 46.

Preferably, prior to tightening onto the steerer tube 33, the stem 34 and front wheel are oriented properly by the rider. In order to allow the top cap 122 to push the stem 34 downwardly to compress the thrust bearing 46 to the appropriate level, the top end 38 of the steerer tube 33 must be positioned below the top surface 68 of the stem 64 to allow some amount of downward motion of the stem 34.

The safety mechanism 22 never functions as a primary system for steering control, but only comes into play in the event the steerer tube 33 breaks. In the event of a steerer tube break, the safety mechanism maintains the proper stem 34 position relative to the front wheel 44, allowing the rider to safely land or control the bicycle after a trick. In the event of a steerer tube 33 break, the primary steering control path (handlebar 36 to stem 34 to steerer tube 33 to fork 40 to wheel 44) changes to the secondary steering control path (handlebar 36 to stem 34 to quill 120 to fork 40 to wheel 44), essentially bypassing the upper broken part of the steerer tube 33.

The torque transfer member also serves to supplement the primary steering control path to prevent the stem from twisting off-axis with respect to the steerer tube and fork. Stem slippage is a problem in BMX and free-style riding, and this system, by giving two means by which to locate and fix the stem axially about the steerer tube, reduces its occurrence.

Figure 6:
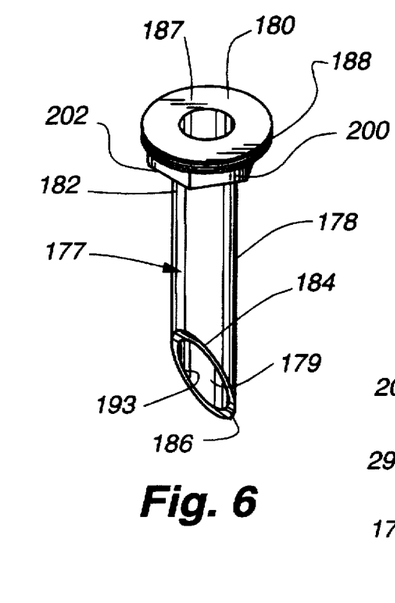
FIG. 6 is a perspective view of an alternative embodiment of the torque transfer member of the present invention.

An alternative embodiment of the torque-transfer member 177 is shown in FIG. 6. Structure identical to the embodiment described above is identified by the original reference number. Structure unique to the alternative embodiment is given a unique reference number for ease of explanation.

The torque-transfer member 177 has an elongated hollow cylindrical main body 178 defining a passageway 179, a laterally extending annular flange 180 at a top end 182, and an angled bottom end 184 defining an engagement surface 186. The annular flange 180 includes an upper surface 187, a lower surface 189, and a threaded circumferential edge 188. Formed in the flange 180 on the bottom surface 189 thereof is a key 200. As shown in FIG. 6, the key 200 has an annular faceted shape, such as a hexagon having six faceted driving faces 202 (only three of which are shown), that extends downwardly therefrom approximately 0.375 inches, and functions as is described further below.

The angled bottom end 184 is formed by an angle cut through the main body 178, which forms a roughly elliptically shaped opening 193 with the exposed sections of the walls of the main body forming the engagement surface 186. The wedge member 94 (not shown) mates with and slidably engages the bottom end 184 of the hollow cylindrical main body 178, as is described in the embodiment above.

Figure 7:
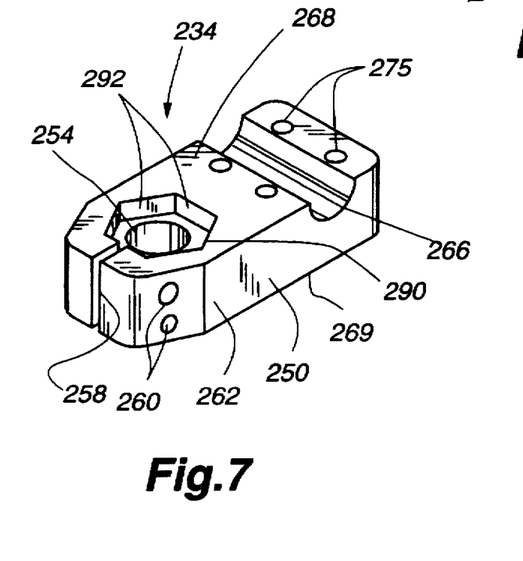
FIG. 7 is a perspective view of an alternative embodiment of the stem.

An alternative embodiment of the stem 234, as shown in FIG. 7, for use with the alternative embodiment of the torgue-transfer member 177, includes a main body 250 and a detachable handlebar clamp 52 (FIG. 3). Formed in the main body 250 is a first bore 254 (FIG. 3) which extends from an upper surface 268 of the main body to a lower surface 269 of the main body, adjacent one end thereof, for receiving the steerer tube 33. A recess 290 is formed in the top surface 268 of the stem 250. In FIG. 7, the recess is shown to be formed substantially concentrically about the first bore 254, and has a hexagonal shape with six facetted engagement faces 292. The recess 290 has a shape complementary to the key 200 for receiving the key in a torque-transferring relationship as described in more detail below.

A slot 258 also extending from the upper surface to the lower surface of the stem 234 communicates with the bore 254. A pair of partially threaded apertures 260 are formed in a side 262 of the main body 250 of the stem 234, and extend through the slot 258, for receiving threaded fasteners such as machine screws. When the stem 234 is removably installed on the steerer tube 33 (FIG. 8) with the threaded fastener engaged in the apertures 260, the slot 258 width is reduced, which reduces the circumference of the first bore 254, thereby allowing the stem 234 to clampingly engage the steerer tube 233.

A substantially horizontal lower groove 266 transverse to the bore 254 is formed in the upper surface 268 of the main body 250 of the stem 234. The handlebar clamping member 52 described above in accordance with the other embodiment functionally corresponds to the top surface 268 of the stem 234. When the clamping member 52 is mated to the main body 250, the transverse grooves 266, 70 receive a base portion of the handlebar 36 (not shown). The handlebars 36 are thus rigidly affixed in a torque transferring relationship to the steerer tube 33 through the stem 234, forming a portion of the primary steering control path described in further detail below.

Four lower handlebar fastening bores 275 extend downwardly through the body 250 of the stem 234 to correspond with the handlebar clamping member 52. Four threaded fasteners 76 (similar to those shown in FIG. 5) are threadedly received in the handlebar fastening bores 275 to affix the handlebar clamping member 52 to the main body 250 of the stem 234.

Figure 8:
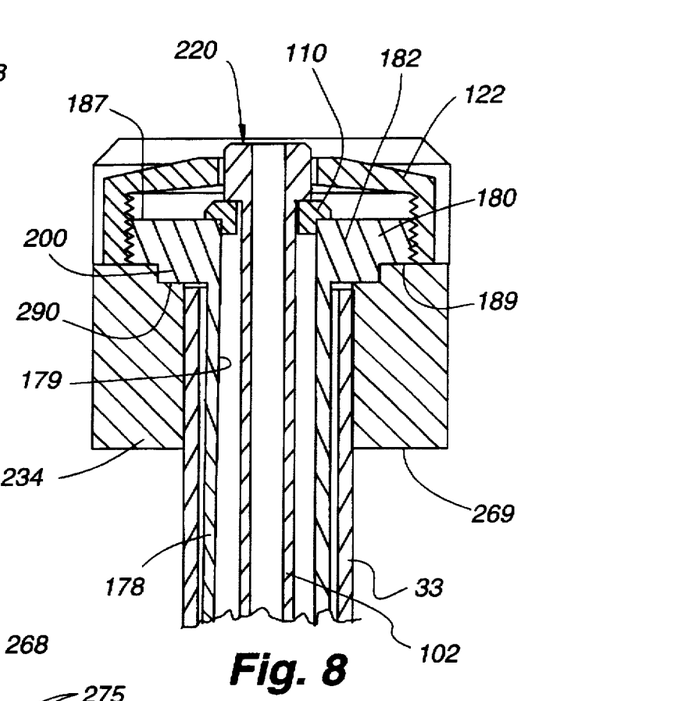
FIG. 8 is a partial representational section of the assembly of the alternative torque-transfer member and the alternative embodiment of the stem in the steering mechanism.

As shown in FIG. 8, to position this alternative embodiment in a steering mechanism 32 (disclosed above), the quill 220 is formed by placing the washer 110 at the top 182 of the passageway 179 in the main body 178, with the hollow bolt 102 then being positioned through the washer 110 and through the cavity 179 in the main body 178 to threadedly engage the threaded aperture 96 in the wedge portion 94. The engagement surface 186 on the bottom end 184 of the main body 178 and the engagement surface 100 on the top end 98 of the wedge 94 are oriented to mate with one another continuously along the respective engagement surfaces 186, 100, analogously to the mated engagement described above with respect to the first embodiment of the safety mechanism.

The stem 234 is then positioned loosely over the steerer tube 33. The bottom surface 269 of the stem 234 rests against the bearing 46 positioned in the head tube 26, analogously to the stem 34 in FIG. 4.

The assembled quill 220 is then positioned in the steerer tube 33 with the key 200 extending from the bottom surface 189 of the annular flange 180, and is seated in the recess 290 formed in the top surface 268 of the stem 234. The key 200 fits into the recess 290, where the driving facets 202 engage the engagement facets 292 to rotationally fix the quill 120 with respect to the stem 234. The engagement of the key 200 with the recess 290 when received therein creates a rotationally stable, torque-transferring interface between the stem 234 and the quill 120.

The hollow bolt 102 is then tightened, conventionally by turning it in a clockwise manner, to draw the wedge portion 94 tightly against the main body 178, forming the jam fit disclosed above. The top cap 122 is then used to load the bearing 46 prior to tightening the stem 234 onto the steering tube.

The key 200 can depend from any portion of the flange to be received in a corresponding recess 290 formed in the top surface of the stem 234.

The primary steering control path and the secondary steering control path are thus formed through the same series of components in the both embodiments.

Presently preferred embodiments of the present invention and many of its improvements have been described with a degree of particularity. This description has been made by way of a preferred example and is based on a present understanding of knowledge available regarding the invention. It should be understood, however, that the scope of the present invention is defined by the following claims, and not necessarily by the detailed description of the preferred embodiment.

What is claimed is:

1. A steering control safety mechanism for a bicycle, wherein the bicycle includes a hollow cylindrical head tube, the safety mechanism comprising: a steering mechanism having a hollow steerer tube with an upper end and a lower end, and being rotationally positioned in the head tube, a fork attached at said lower end of said steerer tube, and a stem releasably attachable to the upper end of the steerer tube for rigidly fixing a handlebar to the steerer tube;

a torque transfer member positioned in the steerer tube and having a passageway extending therethrough;

a wedge member positioned in the steerer tube below the torque transfer member;

a bolt rotationally positioned in the torque transfer member passageway, supported on the torque transfer member, and aligned to laterally offset the wedge member from the torque transfer member and cause the torque transfer member and the wedge member to form a jam fit and oppositely engage the steerer tube to releasably attach the torque transfer member thereto.

wherein a first steering control path is defined in the steering mechanism by connections between the handlebar, stem, steerer tube and fork, and wherein a second steering control path is defined in the steering mechanism by connections between the handlebar, stem, torque transfer member, wedge member, steerer tube and fork, with the second steering control path utilized upon the failure of the steerer tube.

2. The steering control mechanism according to claim 1 wherein the torque transfer member further includes a bottom end defining an angled engagement surface, and the wedge member further includes an upper end having an angled engagement surface, with the wedge member oriented in the steerer tube for alignment of the wedge member engagement surface with the torque transfer member engagement surface.

3. The steering control mechanism according to claim 1 wherein the bolt is threaded and the wedge member includes a threaded cavity adapted to engage the bolt threads.

4. The steering control mechanism according to claim 1 wherein the second steering control path is utilized only upon the failure of the steerer tube.

5. A steering control safety mechanism for a bicycle, wherein the bicycle includes a hollow cylindrical head tube having a top bearing structure and a bottom bearing structure, the safety mechanism comprising: a steering mechanism including a hollow steerer tube having an open top end and a lower end, a fork attached at the lower end of the steerer tube, with the steerer tube being rotationally positioned in the head tube, and including a stem, having a slot, releasably attachable to the top end of the steerer tube, the stem for rigidly fixing a handlebar to the steerer tube;

a torque transfer member positioned in the steerer tube and having a hollow main body with a top end defining a laterally extending annular flange, and a bottom end defining an angled engagement surface;

a wedge member positioned in the steerer tube below said torque transfer member, and having a threaded cavity, and a top end defining an angled engagement surface, said wedge member oriented in the steerer tube for alignment of said wedge member engagement surface with said torque transfer member engagement surface;

a bolt having a threaded bottom end and a top end, said bolt being rotationally positioned in said torque transfer member and said top end of said bolt being supported by said top end of said torque transfer member, and said bottom end of said bolt threadedly engaging said threaded cavity of said wedge member, said bolt adjusted to laterally offset said wedge member from said torque transfer member along said engagement surfaces to cause the torque transfer member and wedge member to form a jam fit and oppositely engage the steerer tube to releasably attach the torque transfer member thereto, said flange engaging a top surface of said stem, and defining an aperture; and a pin positioned in said aperture in said flange to extend downwardly therefrom and engage said slot; wherein a first steering control path is defined in the steering mechanism by the rigid connection between the handlebar, stem, steerer tube and fork, and wherein a second steering control path is defined in the steering mechanism by the rigid connection between the handlebar, stem, torque transfer member, wedge member, steerer tube and fork, said second steering control path utilized upon the failure of the steerer tube.

6. A steering control safety mechanism for a bicycle, wherein the bicycle includes a hollow head tube, the safety mechanism comprising: a steering mechanism having a hollow steerer tube with an upper end and a lower end and being rotationally positioned in the head tube, a fork attached at said lower end, and a stem attached to the upper end of the steerer tube for rigidly fixing a handlebar to the steerer tube;

a torque transfer member having a passageway extending therethrough, and being positioned in the steerer tube to engage the stem in a torque-transmitting relationship separately from the engagement of the stem with the steerer tube, the torque transfer member also engaging the steerer tube in a torque-transmitting relationship, wherein a first steering control path is defined in the steering mechanism by connections between the handlebar, stem, steerer tube and fork, and wherein a second steering control path is defined in the steering mechanism by connections between the handlebar, stem, torque transfer member, steerer tube and fork, with the second steering control path utilized upon the failure of the steerer tube.

7. A steering control safety mechanism for a bicycle, wherein the bicycle includes a hollow head tube, the safety mechanism comprising: a steering mechanism having a hollow steerer tube with an upper end and a lower end and being rotationally positioned in the head tube, a fork attached at said lower end, and a stem releasably attachable to the upper end of the steerer tube for rigidly fixing a handlebar to the steerer tube;

a torque transfer member having a passageway extending therethrough, positioned in the steerer tube;

means positioned in the steerer tube for engaging the torque transfer member with the steerer tube in a torque-transferring relationship separately from the engagement of the stem to the steerer tube wherein a first steering control path is defined in the steering mechanism by connections between the handlebar, stem, steerer tube and fork, and wherein a second steering control path is defined in the steering mechanism by connections between the handlebar, stem, torque transfer member, steerer tube and fork, with the second steering control path utilized upon the failure of the steerer tube.

8. A steering control safety mechanism for a bicycle, wherein the bicycle includes a hollow cylindrical head tube having a top bearing structure and a bottom bearing structure, the safety mechanism comprising: a steering mechanism having a hollow steerer tube with an open top end and a lower end, a fork attached at the lower end, with the steerer tube being rotationally positioned in the head tube, and including a handlebar;

a torque transfer member positioned in the steerer tube and having a hollow main body with a top end defining a laterally extending annular flange, and a bottom end defining an angled engagement surface;

a wedge member positioned in the steerer tube below said torque transfer member, and having a threaded cavity, and a top end defining an angled engagement surface, said wedge member oriented in the steerer tube for alignment of said wedge member engagement surface with said torque transfer member engagement surface;

a bolt having a threaded bottom end and a top end, said bolt being rotationally positioned in said torque transfer member and said top end of said bolt being supported by said top end of said torque transfer member, and said bottom end of said bolt threadedly engaging said threaded cavity of said wedge member, said bolt adjusted to laterally offset said wedge member from said torque transfer member along said engagement surfaces to cause the torque transfer member and wedge member to form a jam fit and oppositely engage the steerer tube to releasably attach the torque transfer member thereto, said flange engaging a top surface of the stem, and defining a downwardly extending key; and a stem releasably attachable to the top end of the steerer tube, the stem for rigidly fixing the handlebar to the steerer tube, a recess formed in a top surface of the stem, said recess having a shape for receiving said key in a torque transmitting relationship between the stem and the steerer tube, wherein a first steering control path is defined in the steering mechanism by the rigid connection between the handlebar, stem, steerer tube and fork, and wherein a second steering control path is defined in the steering mechanism by the rigid connection between the handlebar, stem, torque transfer member, wedge member, steerer tube and fork, said second steering control path utilized only upon the failure of the steerer tube.

* * * * *